(12) United States Patent
Rosthal et al.

(10) Patent No.: US 8,638,103 B2
(45) Date of Patent: Jan. 28, 2014

(54) ELECTROMAGNETIC LOGGING BETWEEN BOREHOLE AND SURFACE

(75) Inventors: Richard Rosthal, Richmond, CA (US); Edward Nichols, Clamart (FR); John Lovell, Houston, TX (US); Christopher Bogath, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 533 days.

(21) Appl. No.: 12/603,053

(22) Filed: Oct. 21, 2009

(65) Prior Publication Data
US 2010/0259267 A1    Oct. 14, 2010

Related U.S. Application Data

(60) Provisional application No. 61/168,281, filed on Apr. 10, 2009.

(51) Int. Cl.
*G01V 3/00* (2006.01)

(52) U.S. Cl.
USPC ........... 324/337; 324/357; 324/365; 324/339; 324/346; 324/356; 702/6

(58) Field of Classification Search
USPC ................................. 702/1–18; 324/323–375
See application file for complete search history.

(56) References Cited

U.S. PATENT DOCUMENTS

| | | | |
|---|---|---|---|
| 4,689,572 A | | 8/1987 | Clark |
| 6,078,868 A | * | 6/2000 | Dubinsky .......................... 702/6 |
| 6,219,619 B1 | | 4/2001 | Xiao et al. |
| 2003/0004646 A1 | | 1/2003 | Haugland |
| 2005/0256642 A1 | * | 11/2005 | Barber et al. ....................... 702/6 |
| 2006/0155471 A1 | * | 7/2006 | Tabarovsky et al. .............. 702/6 |
| 2007/0052551 A1 | | 3/2007 | Lovell et al. |
| 2008/0025146 A1 | * | 1/2008 | Welker ........................... 367/20 |

FOREIGN PATENT DOCUMENTS

GB    2437144    10/2007

OTHER PUBLICATIONS

Halliday and Resnick, Physics Part II, Copyright 1960, 1962.*

* cited by examiner

*Primary Examiner* — Arleen M Vazquez
*Assistant Examiner* — Son Le
(74) *Attorney, Agent, or Firm* — Jeremy Berman

(57) ABSTRACT

The present disclosure relates to determining a property, such as resistivity, of an earth formation. A transmitter is disposed in a wellbore penetrating the formation, and a plurality of receivers are distributed on or near the earth's surface. The transmitter sends electromagnetic energy into the formation and the resulting signal, after passing through the formation, is detected by the array of receivers. The received signal is used to determine the property of the formation. This is often achieved using an inversion or numerical model of the formation being measured. The inversion takes into account changes in the background formation model due to transmitting from various locations. The measurements made on the formation can be performed while drilling the wellbore or subsequent to the drilling.

14 Claims, 4 Drawing Sheets

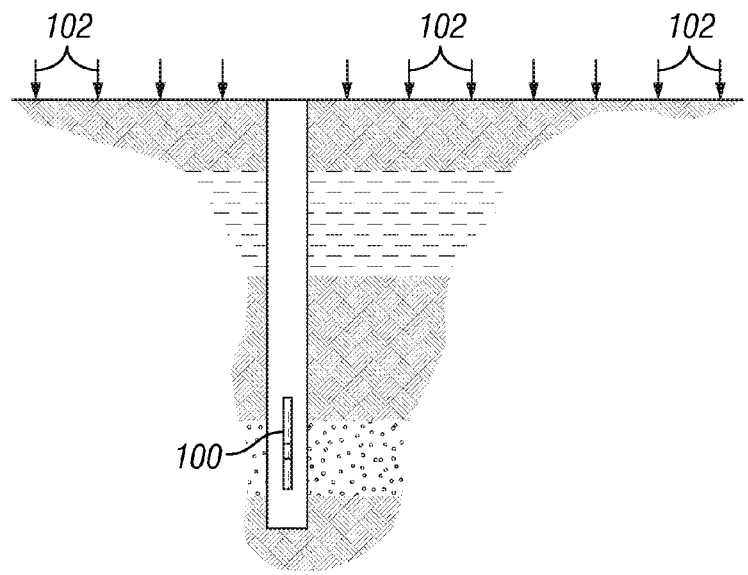
FIG. 1
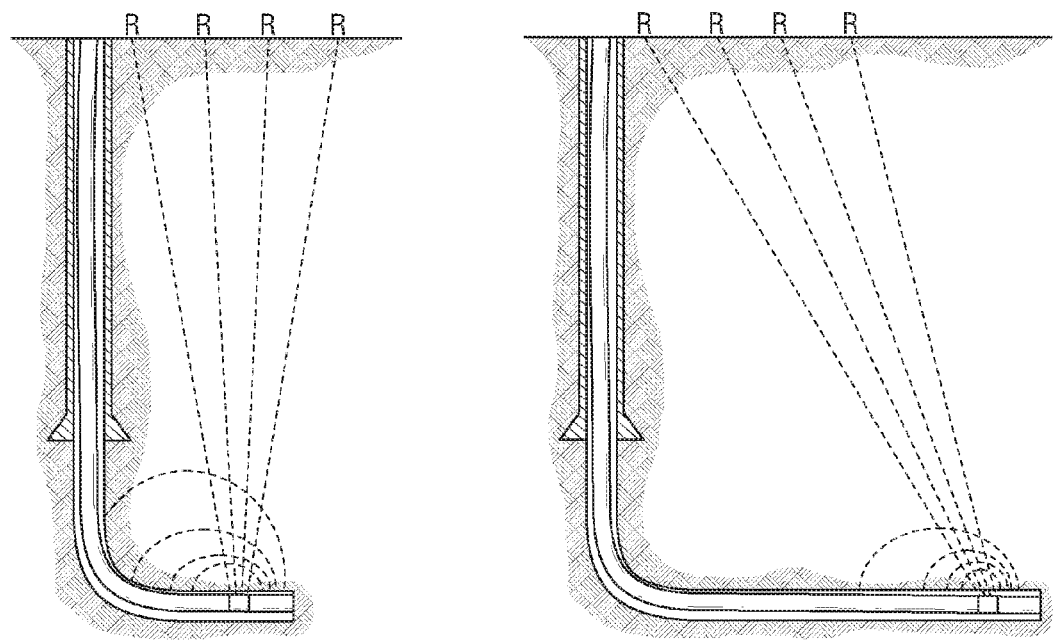
FIG. 2A  FIG. 2B

ELECTROMAGNETIC LOGGING BETWEEN BOREHOLE AND SURFACE

CROSS-REFERENCE TO OTHER APPLICATIONS

This application claims the benefit under 35 U.S.C. §119(e) of U.S. Provisional Application Ser. No. 61/168,281, entitled "Borehole to Surface Resistivity Logging," filed Apr. 10, 2009, which is hereby incorporated by reference.

TECHNICAL FIELD

The present application relates generally to the field of electromagnetic logging, and particularly to electromagnetic logging using one or more transmitters disposed in a borehole and one or more receivers located on the surface.

BACKGROUND

Resistivity measurements of the earth's subsurface between proximately located wellbores are known as "crosswell measurements". Various tools and methods to perform crosswell logging, and thereby obtain crosswell measurement data sets, are known in the art. A crosswell data set is typically collected by moving a transmitter in one well and a receiver array in another well. Measurements of the electric and magnetic fields corresponding to various positions of the transmitter and receiver array are made. A sophisticated inversion process is necessary to interpret this data set and obtain a resistivity image of the region between the wells. A typical crosswell logging system uses a transmitter that produces a large vertical magnetic moment and very sensitive receivers that are particularly sensitive to the vertical moment of the magnetic field.

Several of the systems designed for crosswell logging use magnetic field transmitters and receivers. Those transmitters and receivers produce magnetic dipole moments oriented along the longitudinal axis of the tool. In principal, either or both of the wells can be cased. However, in practice, the use of standard magnetic steel casing for both wells is problematic due to the severe attenuation caused by the casing. Successful and useful logs have been obtained where both wells are open holes or where the receiver well is cased with magnetic casing. In addition, successful logs have been obtained where one or both wells are cased with steel having a high chromium content. That casing is non-magnetic and has a lower conductivity than standard casing. As a result, the attenuation is much less than with standard magnetic steel casing.

There are also various tools that transmit an electromagnetic signal from within a wellbore to one or more receivers located on the surface. For example, there is a wireline tool designed to measure formation resistivity in cased wells, a logging while drilling (LWD) tool that sends a current across an insulated gap in the tool and into the formation, and a production logging tool that provides for wireless telemetry between a downhole component and the surface. All three operate by producing axial currents along the wellbore.

SUMMARY

The present disclosure relates to determining a property, such as resistivity, of an earth formation. A transmitter is disposed in a wellbore penetrating the formation, and one or more receivers are distributed on or near the earth's surface. The transmitter sends electromagnetic energy into the formation and the resulting signal, after passing through the formation, is detected by the array of receivers. The received signal is used to determine the property of the formation. This is often achieved using an inversion or numerical model of the formation being measured. The inversion takes into account changes in the background formation model due to transmitting from various locations. The measurements made on the formation can be performed while drilling the wellbore or subsequent to the drilling.

BRIEF DESCRIPTION OF THE FIGURES

FIG. 1 is a schematic view of an embodiment of a system used to make borehole-to-surface resistivity measurements, in accordance with the present disclosure.

FIGS. 2A and 2B are schematic views showing the transmitter at two different transmitter locations and the associated changes in the background formation model, in accordance with the present disclosure.

Figure 3:
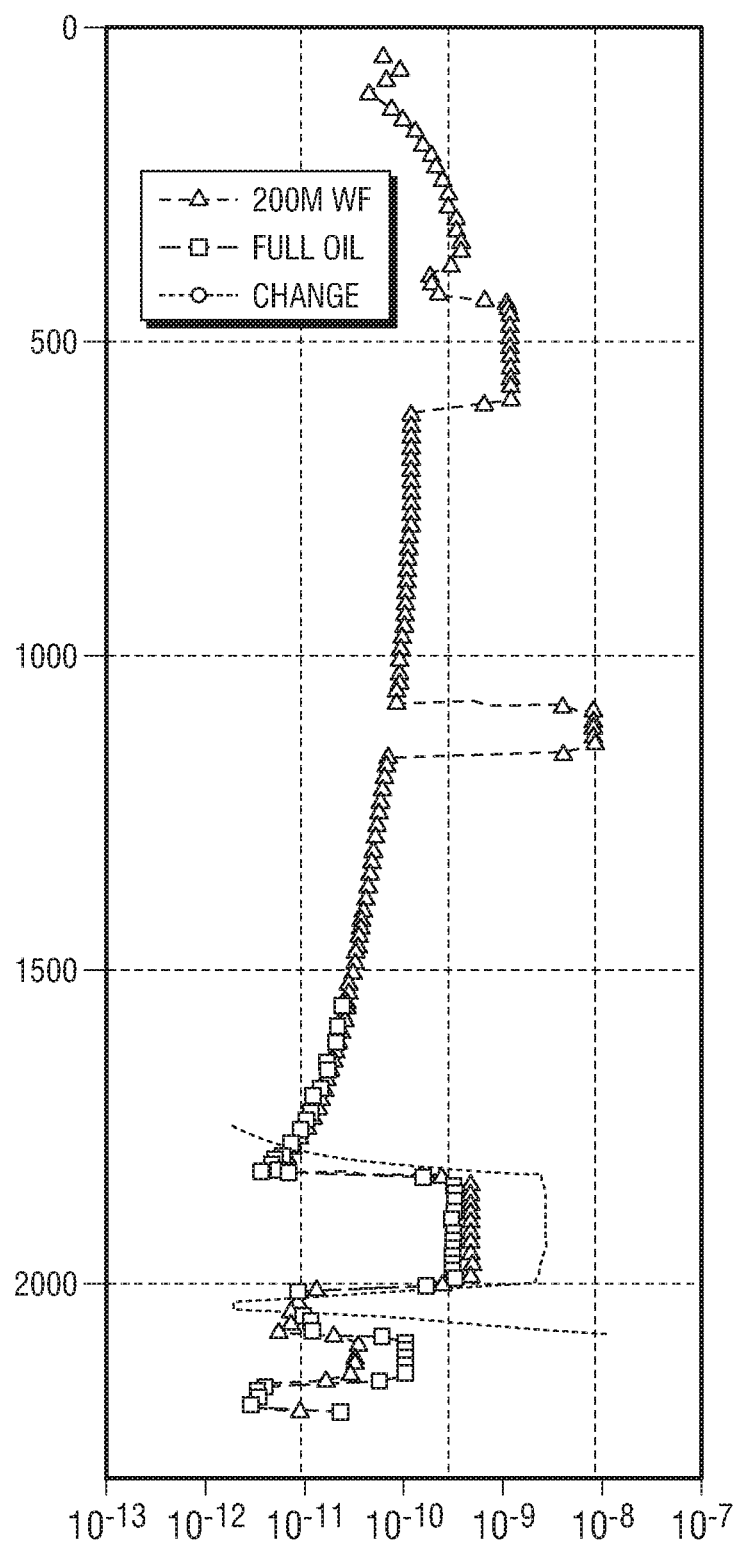
FIG. 3 is a graph showing the sensitivity to position of a waterfront of borehole-to-surface (or surface-to-borehole) resistivity measurements obtained using a model of an example formation and an embodiment of a system used to make borehole-to-surface resistivity measurements, in accordance with the present disclosure.

It is to be understood that the drawings are to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency. In the following description, numerous details are set forth to provide an understanding of the present invention. However, it will be understood by those skilled in the art that the present invention may be practiced without many of these details and that numerous variations or modifications from the described embodiments are possible. The term "vertical", as used herein, means substantially aligned with or parallel to the longitudinal axis of a wellbore, unless indicated otherwise.

Complementary measurements to crosswell logging are surface-to-borehole or borehole-to-surface measurements. For such measurements, a source is placed at the surface and a receiver downhole, or vice versa. Experiments have been performed in which the source was an electric dipole (e.g., a large generator connected to two stakes driven into the earth) and the receiver was a conventional crosswell magnetic field receiver that sensed the vertical component of the resulting magnetic field. In modeling such surface-to-borehole measurements, it was found that measurements of the vertical component of the electric field provided good sensitivity to formation measurements. Experiments indicated that currently existing receivers could be modified to measure the vertical component of the electric field.

In modeling to determine the feasibility of surface-to-borehole measurements, all possible combinations were considered. That is, all the couplings between various orientations of electric or magnetic moments for the transmitter and for the receiver were calculated. In particular, it was found that a measurement of the vertical electric field in the borehole had high sensitivity to the formation, especially for the case where an electric source was used. Measurements in a tube filled with salty water confirmed that it was possible to measure the electric field between sections of the housing of an existing electromagnetic tool, with the ability to resolve signals down to the nanovolt level.

The principal of reciprocity in electromagnetics states that the same result is obtained if one switches the transmitter and the receiver. Thus, a measurement of the vertical electric field in a borehole from a source at the surface is equivalent to measuring the field at the surface from a vertical dipole transmitter downhole. As indicated above, there already are commercial tools that transmit from downhole locations to receivers at the surface. The above-mentioned LWD tool transmits data collected by the tool to the surface by creating a voltage difference across an insulated section on the surface of the drill collar. This voltage is modulated in the frequency range of 0.1875-12 Hz to transmit data to the surface. At the surface, electrodes measure the voltage (generally between the wellhead and a distant electrode) and the data is demodulated. The tool has downhole memory and is capable of recording the voltage and current across the gap, or otherwise makes measurements from which the voltage and current can be obtained.

The above-mentioned production logging tool operates on the same principal, but also has the ability to receive transmissions from the surface. It operates in the frequency range of 0.25-3 Hz. Both tools are designed to transmit signals from a downhole antenna having a vertical electric dipole moment. The above-mentioned wireline tool, used to measure formation resistivity in cased wells, operates at approximately 1 Hz. Recall, as used herein, "vertical" means substantially parallel to the longitudinal axis of the wellbore in which the transmitter is disposed.

Thus, one can make a borehole-to-surface measurement that provides the same information as a surface-to-borehole measurement that measures the vertical electric field downhole. To make such a borehole-to-surface measurement, one can use a downhole tool that produces a vertical electric dipole moment in combination with an array of surface sensors. The sensors (receivers) on the surface can be of at least two types: (1) electrode sensors; and (2) magnetic field sensors. Electrode sensors may include, for example, stakes driven into the ground, or alternatively, non-polarizing electrodes (for lower frequency measurements), with the voltage measured between them. That would allow the production of a map of the voltage on the surface. Alternatively, for a magnetic field sensor, the magnetic field could be measured with sensors similar to those used for crosswell logging or with other sorts of conventional magnetic field sensors such as Hall probes, fluxgate magnetometers, or SQUIDS (Superconducting Quantum Interference Devices). Since those devices do not need to withstand downhole conditions, they can be far less expensive to make and easier to procure, setup, and operate than downhole tools.

For example, the above-mentioned LWD tool makes two types of measurements. One is the impedance of the downhole transmitter; that is, the ratio V/I for the voltage and current across the insulating gap. That gives a local measurement that is roughly proportional to the formation resistivity. In addition, the signal (i.e., voltage) at the surface is measured between the wellhead and a stake placed some distance away. As the well is drilled and the LWD tool gets farther from the wellhead, the signal strength decreases. The rate of decrease is a function of the geometry of the well and also the resistivity of the formation. The more conductive the formation, the more rapidly the signal strength decreases. By monitoring the signal strength, low resolution, deep measurements of the formation resistivity are obtained. One can generalize this second measurement type by introducing an array of sensors on the surface to obtain a map of the subsurface resistivity. In addition, one can measure the magnetic field using an array of surface receivers, in addition to the electric field, to provide increased lateral sensitivity around the borehole. The measurements can be made while the tool is being used in its normal role as an LWD telemetry tool, without additional rig time. Thus, an open-hole log may be produced.

Thus, in one embodiment, the downhole transmitter can be moved, either for the specific purpose of enhancing the determination of the earth formation properties, or because of the nature of the wellbore operation. It may be possible to increase the efficiency of the wellbore operation by performing some of the measurements while the transmitter is stationary and some of the measurements while the transmitter is moving.

A moving transmitter introduces a complication to what is known as an inversion process (described in more detail below). In many cases, the use of an axially oriented electrical dipole means that currents will be induced on the metallic structure of the casing, completion components, drill pipe, or other metallic/conductive conduit in the wellbore, such as coiled tubing or wireline cable armor. When the transmitter moves, the metallic structure, in effect, has changed. That is, there is more drill pipe in the wellbore, the transmitter is farther from the casing shoe, etc. As a result, the inversion for earth formation properties will be more accurate if it takes into account the changing metallic structure as the transmitter moves.

FIG. 1 shows a conceptual diagram of a system to perform borehole-to-surface logging, in this case utilizing a downhole electric dipole source 100. The surface sensors 102 could be either electrode voltage sensors or, more generally, they could be magnetic field sensors with arbitrary orientations. In addition, although it is not obvious from the picture, the surface sensors could be arranged in a two-dimensional pattern or grid, and the borehole may be oriented in other than a vertical manner.

An alternate configuration is where the receivers are located on the sea bottom, configured such as the sea bottom receivers used in CSEM (Controlled Source Electromagnetic) and marine MT (Magnetotelluric) exploration, or where the receivers are configured in a sea bottom cable system comprising electric or magnetic receivers. In this case, the receivers will generally measure the horizontal components of the electric field and all three components of the magnetic field. However, in principal, there is nothing to preclude the collection of all three components of the electric field. Obviously, a subset of those measurements could be made. Note that the receivers could also be deployed in one or more other boreholes, in addition to surface or sea bottom deployments. Measurements can also be made using an array of sensors on a towed cable deployment in water, though in some cases the transmitted signals will be below the threshold noise levels of the electric or magnetic receivers.

The downhole source signal used as a transmitting dipole provides the source energy to transmit to remote surface receivers. Modeling codes can simulate the propagation of the electromagnetic energy through the formation and wellbore to the receivers, including the propagation of energy along any completion or other conductive structures in the wellbore. That information is used to produce a formation resistivity distribution or formation resistivity image. Interpretation of the data is similar to that of crosswell logging, in that various constraints are applied to a numerical model of the earth to determine the model that provides the best match between the observed data and the numerically predicted data. This process is generally called "inversion" of the observed data. The inversion can be performed in either the frequency or time domain.

The model can be, for example, a many-layered 1-D, 2-D, or 3-D model. The conductivities (reciprocal of resistivities) can be anisotropic or otherwise complex at each cell within the numerical model. The wellbore can be modeled as having a single inclination (e.g., vertical relative to gravity), as a sum of linear segments, each with a known inclination and azimuth, or by a 3-D parametric equation (e.g., constant curvature between set points). Generally, the complexity of the model is a matter of survey and interpretation cost optimization, where more complex structures require more data and computation time to optimize the best fit model. Added complexity can result in decreased stability of the solution, as is true in crosswell and seismic surveys.

As discussed above, the stability of the inversion can be improved by using data measured from a multiplicity of transmitter positions, and the accuracy of the inversion can be improved by taking into account any change of conductive structures corresponding to the changing transmitter position. In general, the earth formation can be considered as a sum of a background "estimated" formation, plus a perturbation taking into account the differences between the actual formation and the background (see FIGS. 2A and 2B). The inversion code can be constructed to just solve for the perturbation zone, which is typically within the domain spanned by the transmitter and receiver positions. The background formation would typically include the wellbore, completion components, and any known metallic/conductive structures in the well, such as casing or drill pipe. In the case of a moving transmitter, a different background could be used for each different transmitter position. For example, as a well is drilled, the length of the wellbore section and drill string increase as the transmitter moves (bit penetrates the formation), thus, producing a different background formation. The perturbation zone to be inverted, however, would not be changing, or would typically change very slowly, with respect to transmitter position. Note that as the models get more complex, it is customary to add more constraints from other information. For example, seismic images may be used to constrain formation surface boundaries or to put limits on ranges of allowable conductivities.

Additional measurements can be combined with the ones described here to improve the performance of the inversion. These could include the integration of standard formation evaluation logs or seismic surveys. If the survey is performed while drilling, then traditional LWD measurements could be made on the same drilling pass. In addition, electrical or magnetic measurements in a second well in the vicinity of the well containing the source could also contain sensors. This would amount to adding crosswell measurements to the borehole-to-surface measurements. Also, surface-to-surface measurements could be added in which additional sources on the surface are used in conjunction with the receivers being used to detect the fields from the downhole source. Finally, measurements which use energized casing could add useful information. The art of finding the 'best' fitting model is addressed by many researchers within the industry and academia since, in general, there is an enormous issue of non-uniqueness that must be addressed to optimize the model fitting.

The downhole electric dipole sources may also be capable of exciting coupled seismic energy (electroseismic phenomena) in which the electromagnetic energy induces stresses at layer boundaries that can be detected by seismic arrays. The numerical model could be extended to model this type of energy since it would provide additional constraints.

While embodiments have been described using existing downhole sources, it may be beneficial to design a separate source to enhance the strength of the transmitter or increase the accuracy of controlling and/or monitoring the source fields. Such a source is contemplated for use herein.

Figure 4:
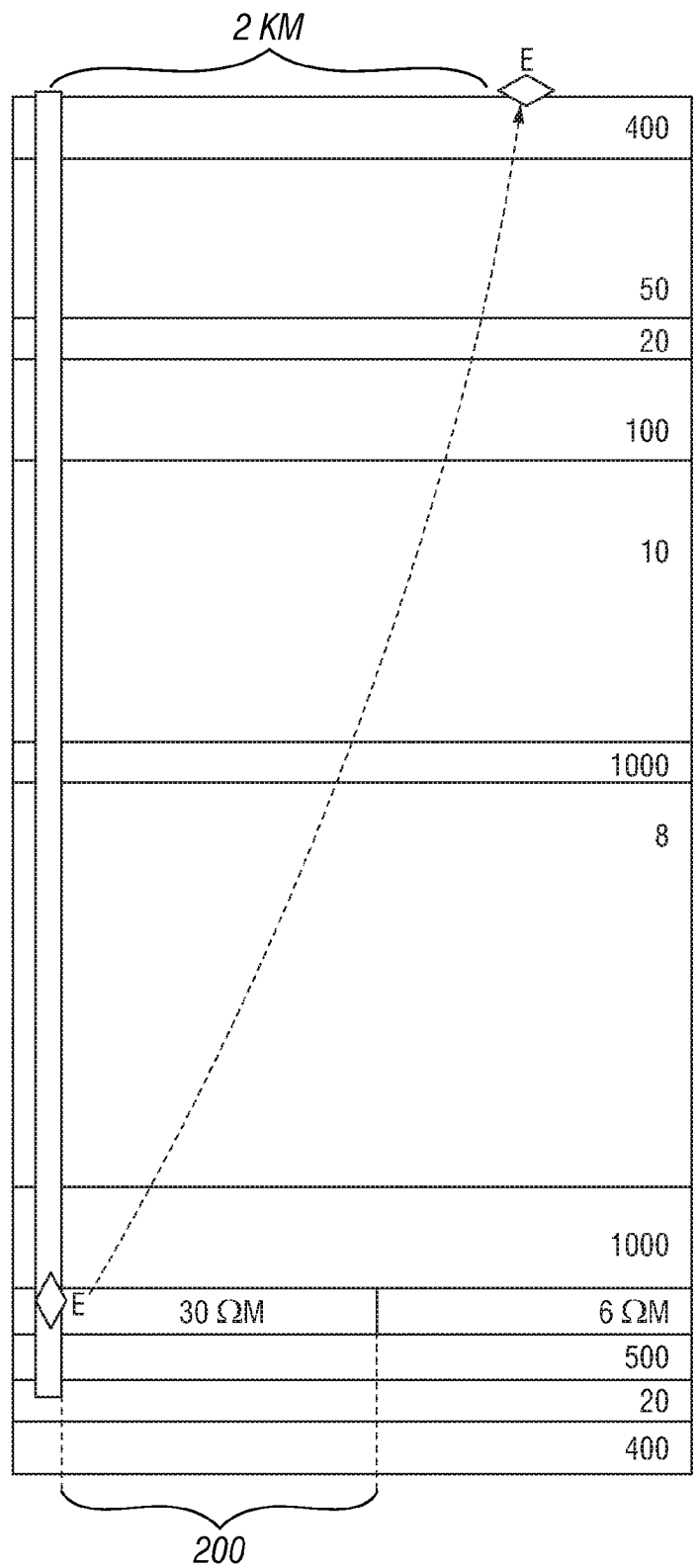
FIG. 4 is a cross-sectional view of the formation model used to produce the graph of FIG. 3.

FIG. 3 shows the sensitivity of the borehole-to-surface measurement relative to depth of invasion, based on modeling results. A cross-section of the formation model is shown in FIG. 4. This model is meant to simulate a waterfront approaching the well. The conductive region (6 Ω-m) represents the conductive water pushing out the more resistive oil (30 Ω-m). It is assumed that this cross-section extends into and out of the page. The measurement represents the coupling between a horizontal electric dipole on the surface and a downhole vertical electric dipole operating at 10 Hz. This model compares the difference between two cases:

1. An infinite layer 50 m thick at a depth of 2000 m with a resistivity of 30 Ω-m (shown by the rectangular symbols).
2. The same layer in which a water-front with a resistivity of 6 Ω-m approaches within 200 m of the well (shown by the triangular symbols).

The difference between those two cases is shown by the curve having circular symbols. The presence of the waterfront causes a change in amplitude of approximately 70%, and a change in phase of approximately 5°. Thus, this measurement has high sensitivity to the approaching water-front.

Figure 5:
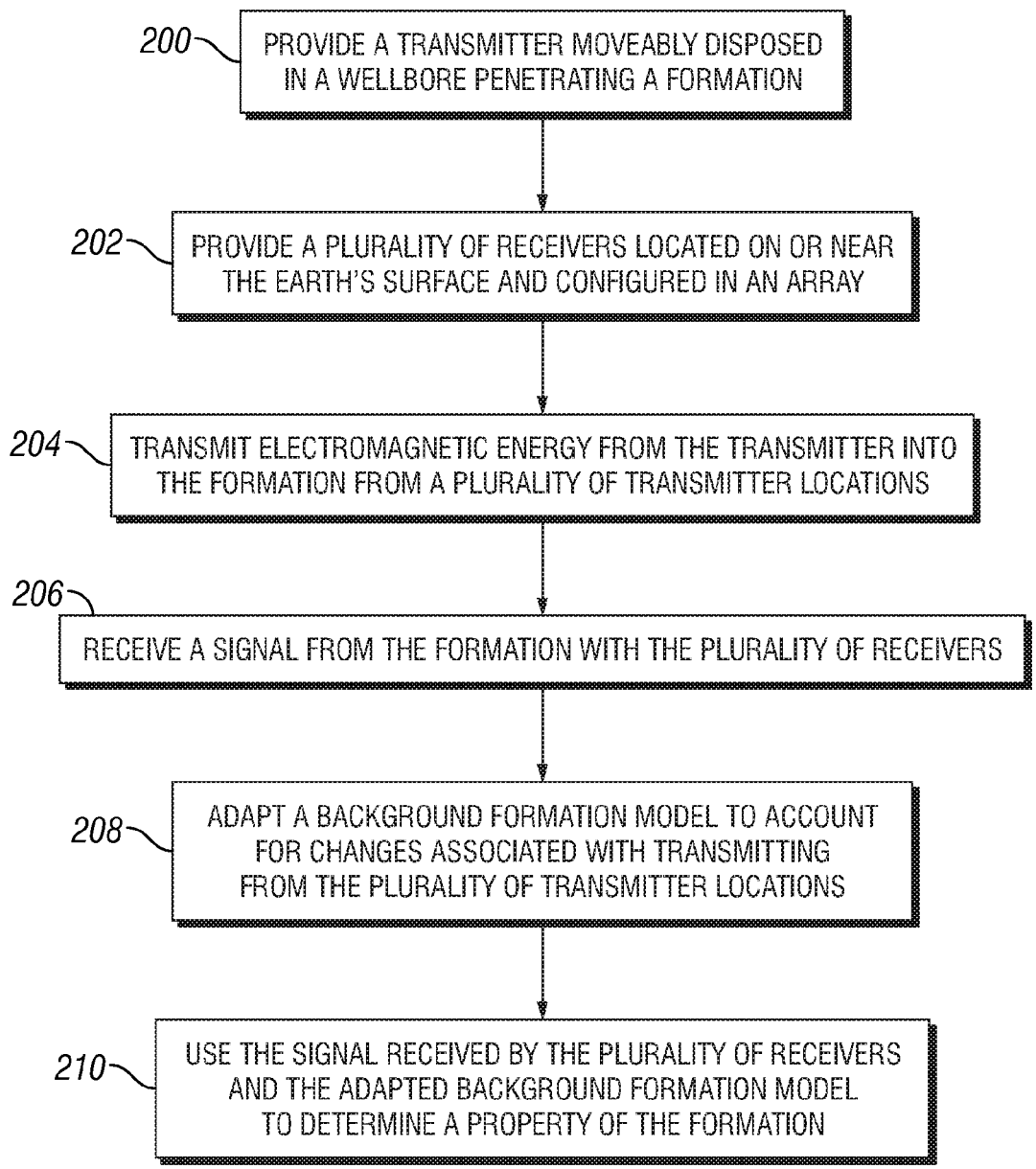
FIG. 5 shows a flowchart describing the steps in one embodiment of the disclosed method.

FIG. 5 shows a flowchart describing the steps in one embodiment of the disclosed method. A transmitter is provided and disposed in a wellbore (step 200), and one or more receivers are provided and deployed on or near the earth's surface (step 202). Electromagnetic energy is transmitted from the transmitter into the formation (step 204), and a signal from the formation is received by the receivers (step 206). The received signal is used to determine a formation property (step 208). A background formation model is modified or adapted to account for changes associated with transmitting from the plurality of transmitter locations (step 210).

In standard surface-to-borehole methodology, the source is on the surface and the sensor is moved through a length of the borehole. After each transit of the sensor, the source is typically moved to a new location and the process is repeated. This is very time consuming. If multiple sensors are instead placed on the surface, the source only needs to be run through the well once. This saves considerable valuable rig time. In addition, a more complete set of sensor positions can be obtained since the rig time does not depend upon the number of measurements. The setup time to deploy surface receivers is generally much shorter than the setup time for surface transmitters.

Because the contact resistance downhole is generally very low, large currents can be used without needing high power (i.e., low voltage may be used). If high voltage is used, it would be applied in the borehole instead of at surface transmitter locations. There is also no need to attempt or arrange to lower the contact resistance of the downhole transmitter as is often done for surface transmitter electrodes. The transmitter waveform can be modified to shape the frequency or time domain content to enhance the ability to increase the signal-to-noise ratio at desired frequencies or transient times, or to otherwise optimize the transmitted energy for the desired formation imaging.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method to determine a property of an earth formation, comprising:
   providing a transmitter that substantially produces an electric dipole moment moveably disposed in a wellbore penetrating the formation;
   providing a plurality of receivers located on or near the earth's surface and configured in an array;
   transmitting electromagnetic energy from the transmitter into the formation from different locations;
   receiving a signal from the formation with the plurality of receivers;
   using a background formation model to account for changes associated with transmitting from the different locations, wherein the background formation model includes parameters that vary with the different locations, with the parameters including at least wellbore geometry and solid metallic material in the wellbore; and
   using the signal received by the plurality of receivers and the background formation model to determine the property of the formation.

2. The method of claim 1, wherein the property is resistivity.

3. The method of claim 1, wherein the transmitter is carried on or is an integral part of a logging while drilling tool, a production logging tool, or a wireline tool.

4. The method of claim 1, wherein the electric dipole moment has a component substantially parallel to a longitudinal axis of the wellbore.

5. The method of claim 1, wherein the receivers are located on land, on the sea bottom, or towed on a cable system.

6. The method of claim 1, wherein the receivers are electrode sensors, electric field sensors, magnetic field sensors, seismic sensors, or a combination of those sensors.

7. The method of claim 1, wherein the using the received signal and the adapted background formation model comprises performing an inversion.

8. The method of claim 7, further comprising using additional measurement types to constrain the inversion.

9. The method of claim 7, wherein the performing an inversion comprises determining unknown parameters of a perturbation zone.

10. The method of claim 9, wherein the parameters of the perturbation zone do not vary or vary slowly with respect to the transmitter locations.

11. A method to determine the resistivity of an earth formation while drilling a wellbore, comprising:
    providing a transmitter carried that substantially produces an electric dipole moment on or within a while drilling tool string;
    providing a plurality of receivers located on or near the earth's surface and configured in an array;
    drilling the wellbore using the while drilling tool string;
    transmitting electromagnetic energy from the transmitter into the formation while drilling the wellbore;
    receiving a signal from the formation with the plurality of receivers;
    using a background formation model to account for changes associated with transmitting from various transmitter locations, wherein the background formation model includes parameters that vary with the transmitter locations, with the parameters including at least wellbore geometry and solid metallic material in the wellbore; and
    using the signal received by the plurality of receivers and the background formation model to determine the resistivity of the formation.

12. The method of claim 11, wherein the using the received signal comprises performing an inversion.

13. The method of claim 12, further comprising;
    placing additional receivers in a nearby existing wellbore;
    receiving the signal from the formation with the additional receivers; and
    using the signal received by the additional receivers in the inversion.

14. The method of claim 11, further comprising towing the plurality of receivers on a cable deployment.

* * * * *